United States Patent [19]

Okuda et al.

[11] 4,320,448
[45] Mar. 16, 1982

[54] VIBRATING COMPRESSOR

[75] Inventors: Yukio Okuda, Fukaya; Naohiro Katayama, Tokyo; Tosio Izumi, Ota, all of Japan

[73] Assignee: Sawafuji Electric Co., Ltd., Tokyo, Japan

[21] Appl. No.: 155,888

[22] Filed: Jun. 2, 1980

[30] Foreign Application Priority Data

Jun. 13, 1979 [JP] Japan .................................. 54-74184

[51] Int. Cl.³ .......................................... H02M 7/537
[52] U.S. Cl. ..................................... 363/134; 363/49; 363/97; 318/132; 323/235
[58] Field of Search ....................... 363/20–21, 363/24–26, 49, 79–80, 95, 97–98, 131, 133–134; 307/252 N, 252 UA; 323/235, 319; 318/132, 126–129

[56] References Cited

U.S. PATENT DOCUMENTS

| | | | |
|---|---|---|---|
| 3,441,831 | 4/1969 | Goto et al. | 363/134 |
| 3,564,394 | 2/1971 | Opal et al. | 323/235 X |
| 3,875,483 | 4/1975 | Farr | 363/134 X |
| 3,916,271 | 10/1975 | Watanabe et al. | 318/132 |
| 3,925,688 | 12/1975 | Kalfus | 307/252 UA |
| 4,027,211 | 5/1977 | Omura et al. | 318/132 X |

Primary Examiner—William M. Shoop
Assistant Examiner—Peter S. Wong

[57] ABSTRACT

A vibrating compressor wherein an alternating voltage is applied from a d-c power source to a drive coil vibrating in a magnetic field via a d-c/a-c converter circuit is disclosed. An alternating voltage of a square wave form is applied to the drive coil of the vibrating compressor in such a manner as to avoid the timing at which a counter electromotive force generated in the drive coil intersects with zero level.

10 Claims, 11 Drawing Figures

VIBRATING COMPRESSOR

BACKGROUND OF THE INVENTION

1. Field of the Invention

This invention relates generally to a vibrating compressor, and more specifically to a vibrating compressor wherein a counter electromotive force generated in a drive coil vibrating in a magnetic field is detected to switch an external drive current in synchronism with said vibration of said drive coil, and said external drive current is adapted to be supplied to said drive coil so as to efficiently facilitate the vibration of said drive coil.

2. Description of the Prior Art

Refrigerators using vibrating compressors have heretofore been widely used on board recreational vehicles. When a refrigerator of this type is equipped on board a recreational vehicle, said vibrating compressor is operated by the d-c power source of the vehicle by converting the voltage of the d-c power source (battery) into an alternating voltage in a d-c/a-c converter circuit to apply to the drive coil of said compressor. Since the frequency of the alternating voltage as an output of said d-c/a-c converter circuit is controlled so as to precisely follow the natural frequency of the mechanical system of said compressor, including said drive coil, said vibrating compressor is operated in the resonant state.

In conventional refrigerators using this type of vibrating compressor, main switching elements are caused to switch by comparing the ($h_{FE} \times I_B$) product of transistors working as said main switching elements with the collector current $I_C$ thereof, as shown in U.S. Pat. No. 3,916,271 and U.S. Pat. No. 4,027,211, both obtained by the present applicant. That is, switching operation is performed at such a timing that the value of the collector current $I_C$ corresponding to a current flowing in said drive coil becomes larger than the value obtained by multiplying the base current $I_B$ given in synchronism with the vibration of the mechanical system by a coefficient $h_{FE}$.

Although the conventional refrigerators can be operated without inconvenience under normal operating conditions, when operated under operating conditions subject to severe temperature changes, the conventional refrigerator may not be operated in the best operating conditions even if the switching point of said transistors is preset to the optimum state because the coefficient $h_{FE}$ of said transistors varies with temperature. Furthermore, in case said coefficient $h_{FE}$ is reduced to an extremely low level due to secular variation, said d-c/a-c converter circuit may deviate from said resonant state, causing abnormal oscillation.

In addition, said coefficient $h_{FE}$ significantly differs with individual transistors. With a standard transistor, there is a difference as large as 5 times between the minimum and maximum values of said coefficient $h_{FE}$. For this reason, when a plurality of transistors are used in combination in a push-pull or bridge circuit system, it is necessary to select those transistors having almost the same value of said coefficient $h_{FE}$.

On the other hand, said collector current $I_C$ does not necessarily accurately represent the state of compressor, that is, the vibrating positions of piston. For example:

(i) When the d-c voltage fed to the d-c/a-c converter circuit contains ripple components, the wave form of said collector current $I_C$ may be distorted from that obrained when the d-c voltage does not contain ripple components.

(ii) The impedance of the electrical system including the drive coil, which is given by the output impedance as viewed from the d-c/a-c converter circuit to the output side, may change when unwanted inductive components, etc. are superimposed on lead wires for feeding current to the drive coil. This may distort the wave form of said collector current $I_C$.

For the reasons cited in (i) and (ii) above, starting troubles or unwanted beat noises may occur, and in extreme cases, unstable oscillation of said d-c/a-c converter circuit may result.

(iii) Furthermore, the same may be said of the case where unwanted inductive components are superposed on lead wires for feeding current to the d-c/a-c converter circuit.

Consequently, in the conventional refrigerators of this type, the power source side and output side impedances of said d-c/a-c converter circuit have to be set at a sufficiently low level, and at the same time, a d-c power source having less ripple components has to be used. To overcome these problems, efforts have been made to obtain a vibrating compressor which uses a completely different system from the conventional one as switching conditions of said main switching elements and yet is capable of precisely following the vibration of the mechanical system.

SUMMARY OF THE INVENTION

It is an object of the present invention, therefore, to provide a vibrating compressor which solves the aforementioned problems.

It is another object of the present invention to provide an efficient vibrating compressor by controlling the timing of applying drive current to said drive coil.

It is still another object of the present invention to provide a vibrating compressor, the on-time cycle setting circuit of which is caused to generate an output for a predetermined period by a signal from the zero-cross delay circuit thereof.

It is a further object of the present invention to provide a vibrating compressor, the on-time cycle setting circuit of which is prevented from inadvertent operation due to an unwanted signal from the drive coil.

It is still a further object of the present invention to provide a vibrating compressor which is started by a signal from the starting circuit thereof even without a signal from the drive coil.

These and other objects of the invention will become more apparent by reference to the following detailed description when considered in connection with the accompanying drawings.

The alternating voltage or current referred to in this invention includes not only the voltage or current the direction of which reverses at regularly recurring intervals but also the voltage or current which is intermittently supplied, for example, in positive direction.

DETAILED DESCRIPTION OF THE EMBODIMENT

A vibrating compressor to be used in a refrigerator, for example, has a drive coil which is vibratably disposed in a stationary magnetic field and driven by an alternating current fed from a power source. In other words, said vibrating compressor has a construction similar to that of a moving coil type loud speaker. Said vibrating compressor is controlled in such a fashion that the frequency of the alternating current fed to said drive coil by said d-c/a-c converter circuit is kept in synchronism with the natural frequency of the mechanical system of said vibrating compressor comprising of drive coil, piston, refrigerant, resonance spring, etc.

Figure 1:
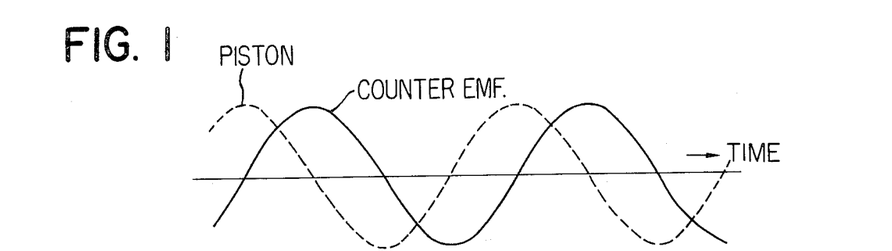
FIGS. 1 through 4 are diagrams of assistance in explaining the operating principle of this invention.

Consequently, assuming that the piston is sinusoidally vibrated as shown by a dotted line in FIG. 1, a counter electromotive force as shown by a solid line in the figure is generated in the drive coil vibrating in the magnetic field.

Figure 2:
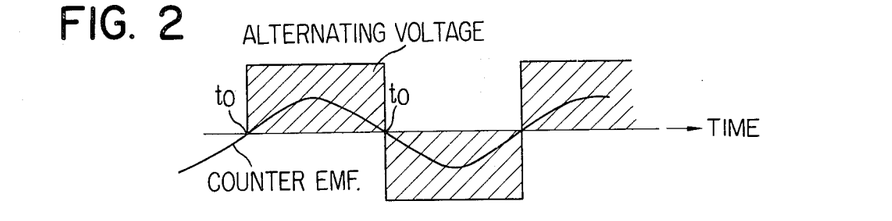

When an alternating voltage is fed from said d-c/a-c converter circuit to the drive coil in synchronism with the vibration of said mechanical system, it is necessary to apply the alternating voltage by precisely matching the phase thereof with the vibration of the mechanical system in such a manner as shown in FIG. 2.

FIG. 2 shows the state where the timing at which the counter electromotive force intersects with the zero level is detected to control the switching of the alternating voltage.

In this case, however, an alternating voltage as shown by hatched portions in FIG. 2 is actually applied to the drive coil from the outside. This makes it extremely difficult to extract and detect the counter electromotive force alone merely by monitoring the voltage generated in the drive coil. For this reason, it is necessary to provide, independently of said drive coil, a detecting coil vibrating in the same magnetic field to cause a voltage synchronizing with said counter electromotive force to generate in the detecting coil, and thereby detecting the timing $t_O$ at which the voltage generated in the detecting coil intersects with the zero level so as to apply an alternating voltage as shown in FIG. 2 to said drive coil.

Figure 3:
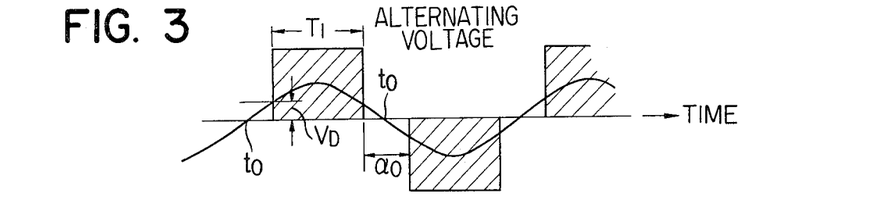
Figure 4:
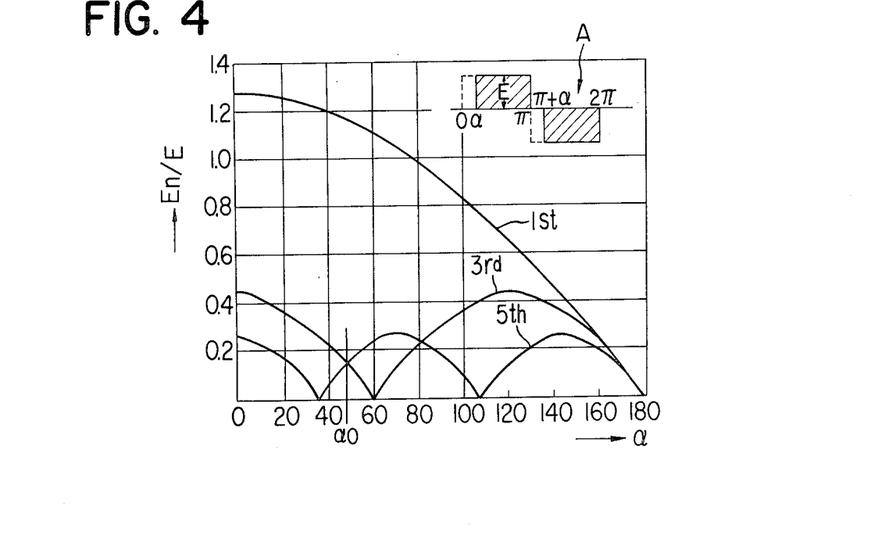

This invention employs a system in which control is effected so as to apply the alternating voltage by avoiding the timing $t_O$ at which said counter electromotive force intersects with the zero level, as shown in FIG. 3, or so that the alternating voltage applied from the outside does not fall within the preceding and succeeding period ($\alpha_O$) including the timing $t_O$, and thereby detecting said timing by means of the terminal voltage of the drive coil. That is, the alternating voltage is applied to said drive coil only after the lapse of a time ($T_D$) in which the counter electromotive force, after intersecting with the zero level, reaches a predetermined voltage $V_D$, as shown in FIG. 3. In this case, it is necessary to turn on the alternating voltage the time ($T_D$) behind the timing $t_O$ and turn off the alternating voltage ahead of the next timing $t_O$ at which the counter electromotive force intersects with the zero level. FIG. 4 is a graph in which, when a square wave having a wave form A as shown by hatched portions in the figure is applied, the magnitudes $E_n$ of its fundamental wave (1st), third harmonic (3rd) and fifth harmonic (5th) are plotted, after normalized with the voltage E, in the graph with the phase angle $\alpha$ as the abscissa.

When driving the drive coil, the fundamental wave component (1st) works as an effective component while the third harmonic (3rd) and the fifth harmonic (5th) become reactive components. Since a power containing harmonic components is given by the square-sum of each component, it is most desirable to cause the square wave to rise at the timing of the phase angle $\alpha_O$ at which the third and fifth harmonic components are small enough. Taking this into account, this invention employs a system where the timing $t_O$ at which said counter electromotive force intersects with the zero level is detected in non-voltage periods provided in increments of $\alpha_O/2$ in terms of phase angle before and after the timing $t_O$, as shown in FIG. 3. By doing this, said timing $t_O$, can be detected merely by monitoring the terminal voltage of the drive coil, and the efficient operation of the vibrating compressor is made possible by choosing said phase angle $\alpha_O$.

Figure 5:
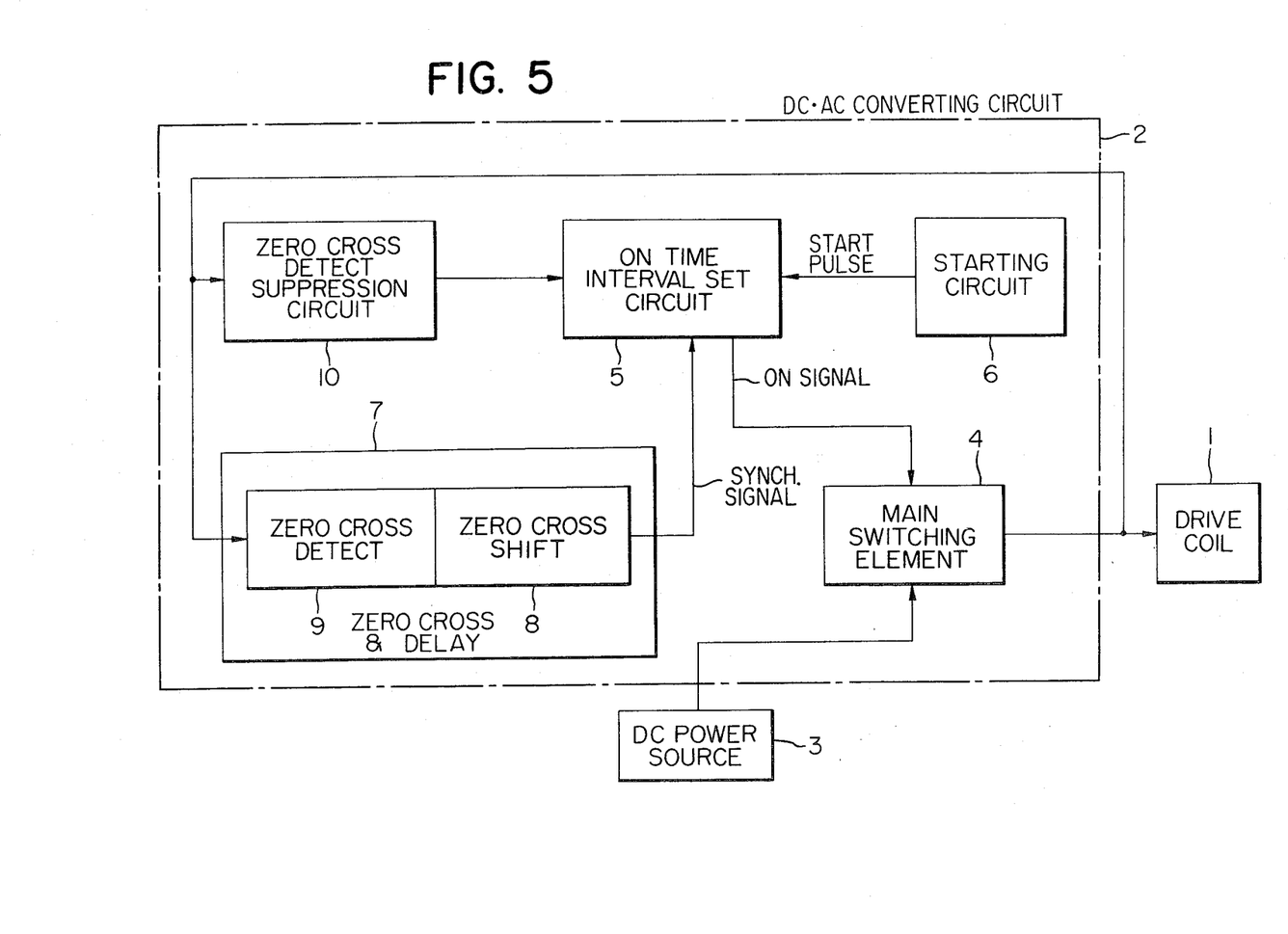
FIG. 5 is a block diagram of a vibrating compressor embodying this invention in which a single main switching element is used.

FIG. 5 is a block diagram of a vibrating compressor embodying this invention. In the figure, reference numeral 1 refers to a drive coil; 2 to a d-c/a-c converter circuit; 3 to a d-c power source; 4 to a main switching element such as a transistor; 5 to an on-time cycle setting circuit for giving drive voltage on-time cycles to the main switching element 4; 6 to a starting circuit for controlling the main switching element 4 to turn on at the start of the compressor; 7 to a zero-cross delay circuit for shifting the terminal voltage level of the drive coil by means of a zero-cross shift circuit 8 and generating synchronizing signals by monitoring the shifted voltage by means of a zero-point detection circuit 9; 10 a zero-point detect suppression circuit which is provided as necessary when the main switching element is comprised of a single switching element for generating on-suppress signals, which will be described later, referring to FIGS. 6 and 7.

The d-c/a-c converter circuit 2 receives a power from the d-c power source 3 to apply an alternating voltage to the drive coil 1. The alternating voltage is applied to the drive coil 1 during periods in which the main switching element 4 is turned on by ON signals from the on-time cycle setting circuit 5.

As described by referring to FIG. 3, the timing $t_O$ at which the terminal voltage of the drive coil 1 intersects with the zero level is detected by the zero-cross delay circuit 7, which generates a synchronizing signal after the lapse of a predetermined time $T_D$. That is, the voltage obtained by subtracting the voltage $V_D$ shown in FIG. 3 from the absolute value of the terminal voltage of the drive coil 1 by means of the zero-cross shift circuit 8 is compared with the zero level by the zero-point detection circuit 9, and the synchronizing signal shown in the figure is generated by the zero-cross delay circuit 7 if the result of comparison is a positive value.

The on-time cycle setting circuit 5 consisting of a flip-flop, for example, issues an ON signal when said synchronizing signal is received and continues to issue that signal during a predetermined time $T_1$ (refer to FIG. 3). This causes the main switching element 4 to maintain its ON state during the time $T_1$, supplying the alternating voltage to the drive coil 1.

The zero-point detect suppression circuit 10 has a function to inhibit the on-time cycle setting circuit 5 to issue an ON signal even when said zero-cross delay circuit 7 generates said synchronizing signal. The function of this zero-point detect suppression circuit 10 will be described later, referring to FIGS. 6 and 7.

Figure 6:
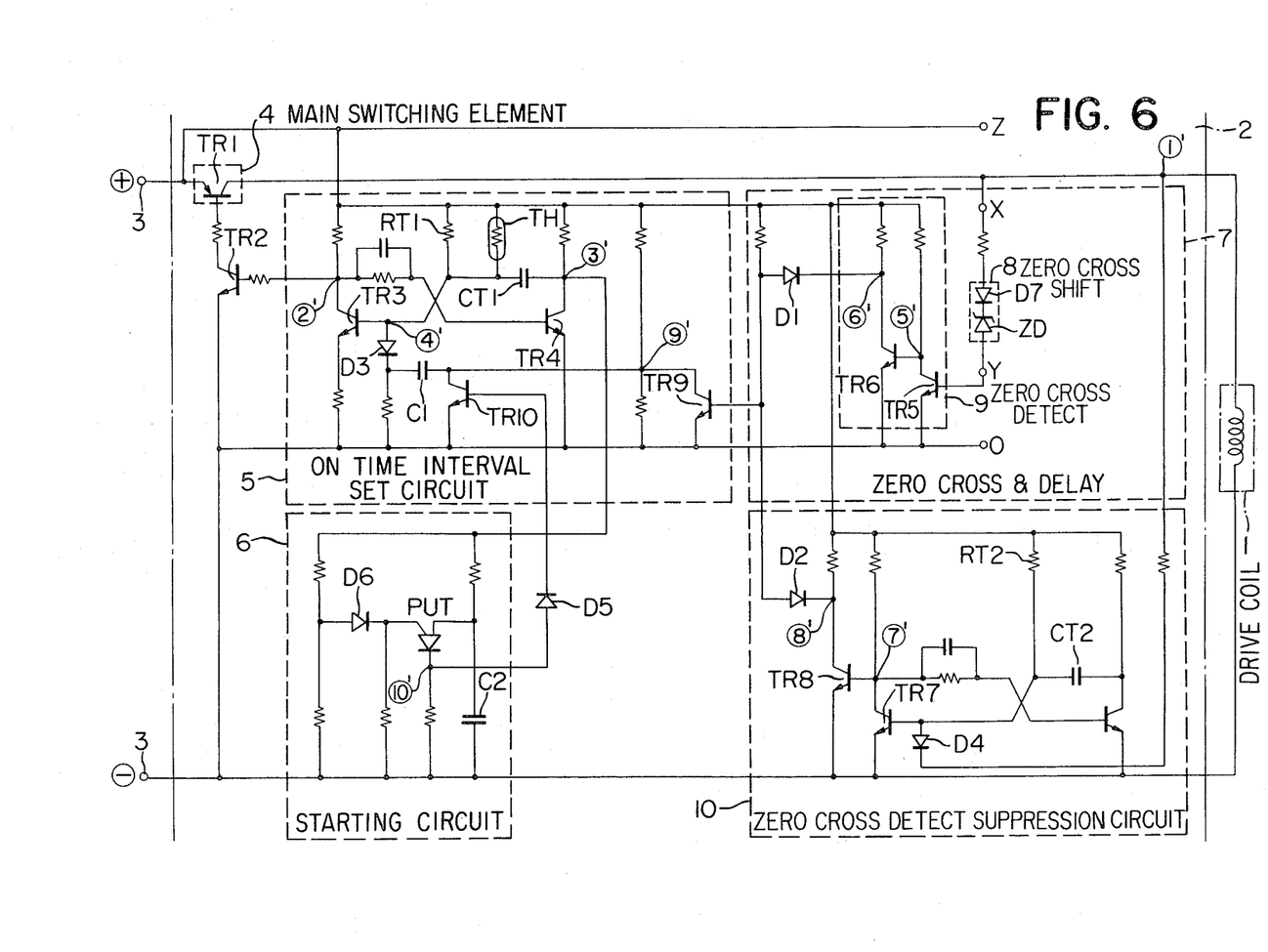
FIG. 6 is a circuit diagram of the d-c/a-c converter circuit embodying this invention of FIG. 5 to illustrate more concretely the configuration thereof.

FIG. 6 is a circuit diagram of the d-c/a-c converter circuit shown in the block diagram of FIG. 5 where a single main switching element is used (hereinafter referred to as the single type). In the figure, numerals 1 through 10 correspond to like numerals in FIG. 5, and symbols $TR_1$ through $TR_{10}$ refer to transistors; PUT to a unijunction transistor; $D_1$ through $D_7$ to diodes; $Z_D$ to a Zener diode; $RT_1$ and $RT_2$ to resistors; $CT_1$, $CT_2$, $C_1$ and $C_2$ to capacitors; TH to a thermistor, respectively.

In the state shown in the figure, an alternating voltage is applied to the drive coil 1 during periods in which the single main switching element 4 comprising the transistor $TR_1$ remains conducting. In the single type d-c/a-c converter circuit, the so-called intermittent voltage is applied to the drive coil 1, but this intermittent voltage is included in the concept of alternating voltage for the purpose of this Specification.

The on-time cycle setting circuit 5 shown in the figure serves as a multivibrator composed of the transistors $TR_3$ and $TR_4$. As the transistor $TR_3$ is turned off, the transistor $TR_2$ is brought into conduction, causing the main transistor $TR_1$ to conduct. The OFF time $T_1$ of the transistor $TR_3$ is determined by the resistor $RT_1$ and the capacitor $CT_1$. The transistor $TR_3$ in the on-time cycle setting circuit 5 is switched to the OFF state when the transistor $TR_9$ or $TR_{10}$ is turned on. That is, when the transistor $TR_{10}$ is turned on by a starting pulse from the starting circuit 6, the base potential of the transistor $TR_3$ is brought to the ground level via the capacitor $C_1$, causing the transistor $TR_3$ to turn off and the main transistor $TR_1$ to turn on. When the transistor $TR_9$ is turned on by an AND circuit consisting of the diodes $D_1$ and $D_2$, the transistor $TR_3$ is similarly turned off, causing the main transistor $TR_1$ to turn on.

The zero-cross delay circuit 7 monitors the terminal voltage of the drive coil 1. That is, the terminal voltage of the drive coil 1, from which said voltage $V_D$ is subtracted by the diode $D_7$ and the Zener diode $Z_D$ constituting the zero-cross shift circuit 8, is monitored by the transistor $TR_5$ constituting the zero-point detection circuit 9. As the transistor $TR_5$ is brought into conduction, the transistor $TR_6$ is turned off. This causes the transistor $TR_9$ to remain in the ON state so long as the transistor $TR_8$ constituting the zero-point detect suppression circuit 10 remains in the OFF state. That is, the transistor $TR_3$ of the on-time cycle setting circuit 5 is turned off.

Figure 7:
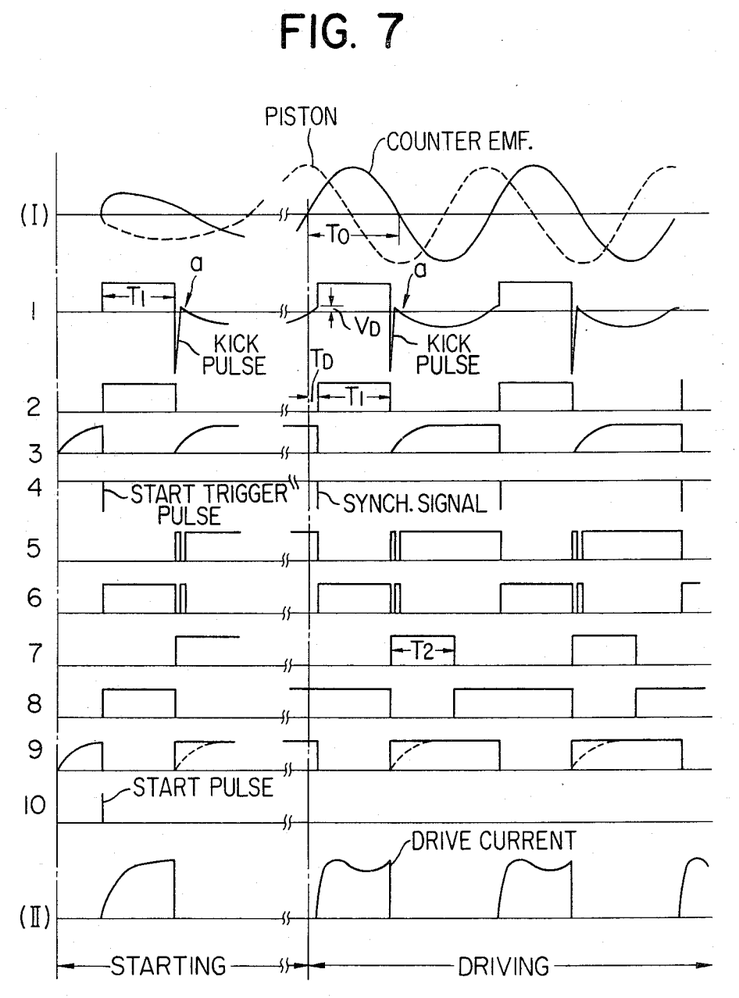
FIG. 7 is a time chart illustrating the operation of the d-c/a-c converter circuit shown in FIG. 6.

FIG. 7 is a time chart illustrating the operation of the circuit shown in FIG. 6. Numerals ①, ②, ... ⑩, represent the potentials of the corresponding points ①', ②', ... ⑩', in FIG. 6 while (I) represents the wave form of the counter electromotive force corresponding to FIG. 1 and (II) represents the wave form of the drive current fed to the drive coil 1.

At the start of the compressor, when a voltage is applied to the terminal 3 (d-c power source) shown in FIG. 6, a voltage is applied to the starting circuit 6 via the point ③', in the figure, causing the capacitor $C_2$ to charge. The unijunction transistor PUT is then turned on at a predetermined timing, generating a starting pulse as shown by ⑩ in the figure. Then a starting trigger pulse shown by ④ in the figure turns on the transistor $TR_{10}$ of the on-time cycle setting circuit 5. This causes the main transistor $TR_1$ to turn on. After the lapse of a time $T_1$ given by the resistor $RT_1$ and the capacitor $CT_1$, the transistor $TR_3$ is turned on again, bringing the main transistor $TR_1$ to the non-conducting state via the transistor $TR_2$. At this time, a kick voltage shown by ① in FIG. 7 is generated across the terminals of the drive coil 1. After the kick voltage disappears, a counter electromotive force generated in the drive coil 1, shown by an arrow a in FIG. 7, crosses the zero-level point. At the timing of the arrow a, the transistor $TR_6$ of the zero-cross delay circuit 7 is temporarily turned off, causing the wave forms at the points ⑤' and ⑥' in FIG. 6 to change to those shown by ⑤ and ⑥ in the figure. In this state, the transistor $TR_9$ is about to be turned on. However, the transistor $TR_9$ must not be turned on at this timing. Therefore, the transistor $TR_8$ of the zero-point detect suppression circuit 10 is caused to turn on to prevent the transistor $TR_9$ from being unwantedly shifted to the ON state.

As shown in the time chart for the driving state in FIG. 7, when the counter electromotive force of the drive coil 1 is shifted from the negative level to the positive level, the transistor $TR_9$ is turned on with a time delay $T_D$. At this time, the transistor $TR_8$ of the zero-point detect suppression circuit 10, which is kept in the OFF state, does not prevent the transistor $TR_9$ from being shifted to the ON state.

The zero-point detect suppression circuit 10 keeps the transistor $TR_8$ in the ON state during a time $T_2$ (shown by ⑦ and ⑧) which is determined by the resistor $RT_2$ and the capacitor $CT_2$ by detecting the kick voltage shown in FIG. 7. However, by setting the charging time constant of the capacitor $C_1$ shown in FIG. 6 at a relatively large value to practically inhibit the capacitor $C_1$ to discharge even when the transistor $TR_9$ is turned on at the time shown by an arrow a in FIG. 7, or by selecting the rise of the potential at the point ⑨' in FIG. 6 as shown by dotted lines in FIG. 7 ⑨, the zero-point detect suppression circuit 10 can be omitted. It is of course desirable in terms of safety to provide the zero-point detect suppression circuit 10.

By causing the main transistor $TR_1$ to turn on, a drive current having a wave form as shown in FIG. 7 (II) is fed to the drive coil 1.

Figure 8:
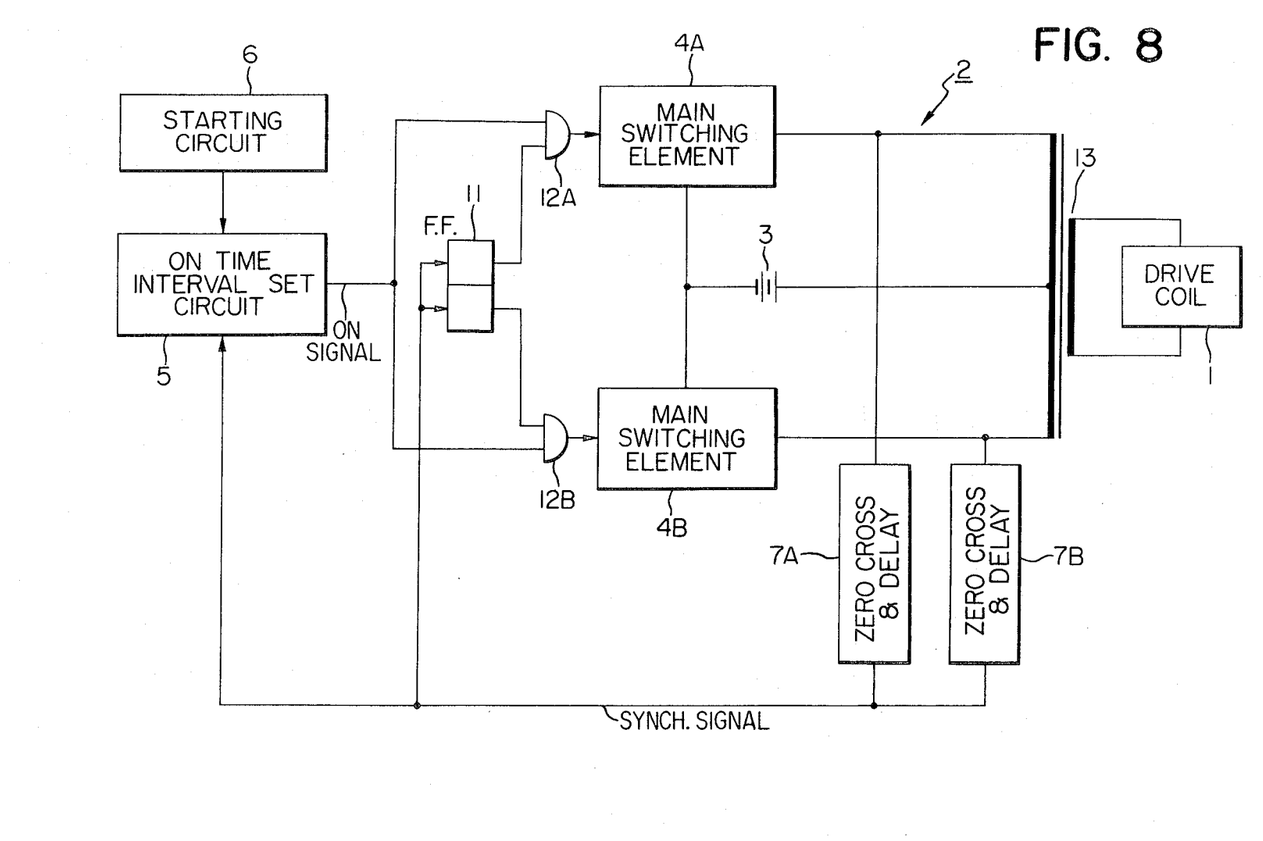
FIG. 8 is a block diagram of a vibrating compressor embodying this invention in which main switching elements are connected in a push-pull configuration.

FIG. 8 is a block diagram of another embodiment of the vibrating compressor of this invention. In the figure, numerals 1, 2, 3, 5 and 6 correspond to like numerals in FIG. 5. Numerals 4A and 4B refer to main switching elements; 7A and 7B to zero-cross delay circuits; 11 to a switching multi-vibrator; and 12A and 12B to AND circuits, respectively.

As in FIG. 5, the zero-cross delay circuits 7A and 7B generate synchronizing signal to trigger the on-time cycle setting circuit 5. With the synchronizing signals, the switching multivibrator 11 such as a flip-flop alternately generates signals, and thereby the main switching element 4A is turned on at the timing when the AND circuit 12A is turned on, and the main switching element 4B is turned on at the timing when the AND circuit 12B is turned on. Thus, the drive coil 1 is driven via the transformer 13.

Figure 9:
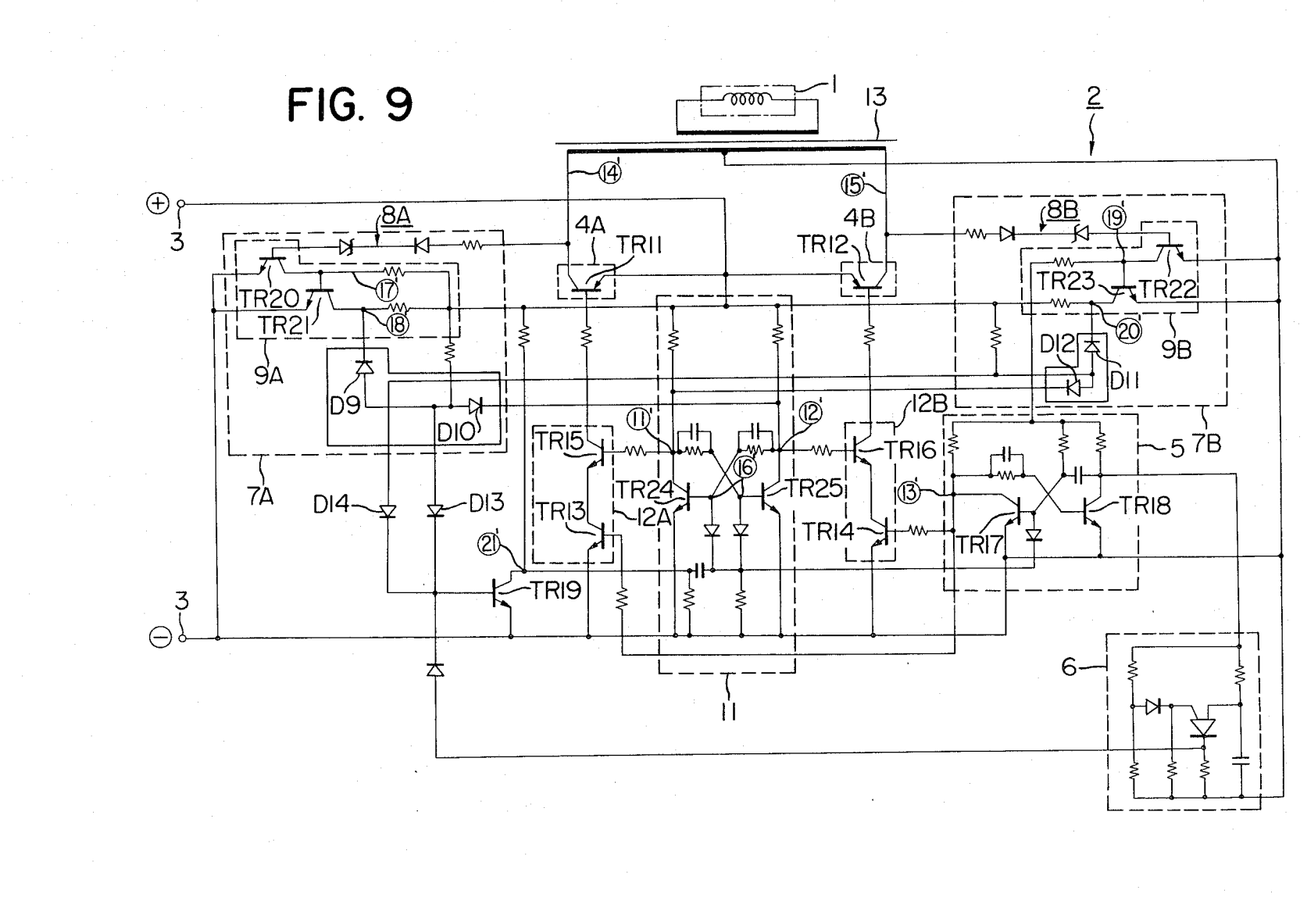
FIG. 9 is a circuit diagram of the d-c/a-c converter circuit embodying this invention, shown in FIG. 8, to illustrate more concrete the configuration thereof.

FIG. 9 is a circuit diagram of the d-c/a-c converter circuit of the block diagram of FIG. 8 to better illustrate the configuration thereof.

In the figure, numeral 1, 2, 3, 4A, 4B, 5, 6, 7A, 7B, 11, 12A, 12B and 13 correspond to like numerals in FIG. 8. Numerals 8A and 8B refer to zero-cross shift circuits; 9A and 9B to zero-point detection circuits, respectively. The main transistor $TR_{11}$ is turned on and off by the AND circuit 12A while the main transistor $TR_{12}$ by the AND circuit 12B. In the figure, the transistor $TR_{19}$ combines the functions of the transistors $TR_9$ and $TR_{10}$ shown in FIG. 6. When the transistor $TR_{19}$ is turned on, the on-time cycle setting circuit 5 is started, and for a predetermined time $T_1$, the transistor $TR_{17}$ is turned off, causing the transistor $TR_{13}$ of AND circuit 12A and the transistor $TR_{14}$ of the AND circuit 12B to turn on. At this time, the transistors $TR_{24}$ and $TR_{25}$ of the flip-flop 11 are alternately turned on, bringing either of the AND circuits 12A and 12B into the ON state. That is, either of the main transistors $TR_{11}$ and $TR_{12}$ is turned on for said time $T_1$.

The transistors $TR_{20}$ and $TR_{21}$ in the zero-cross delay circuit 7A shown in FIG. 9 correspond to the transistors $TR_5$ and $TR_6$ shown in FIG. 6, respectively. The outputs of the zero-cross delay circuit 7A and the flip-flop 11 are subjected to AND logic operation via the diodes $D_9$ and $D_{10}$, the resulting output being fed to the transistor $TR_{19}$ via the diode $D_{13}$. Similarly, the transistors $TR_{22}$ and $TR_{23}$ in the zero-cross delay circuit 7B correspond to the transistors $TR_5$ and $TR_6$ shown in FIG. 6. The outputs of the zero-cross delay circuit 7B and the flip-flop 11 are subjected to AND logic operation via the diodes $D_{11}$ and $D_{12}$, the resulting output being fed to the transistor $TR_{19}$ via the diode $D_{14}$.

Figure 10:
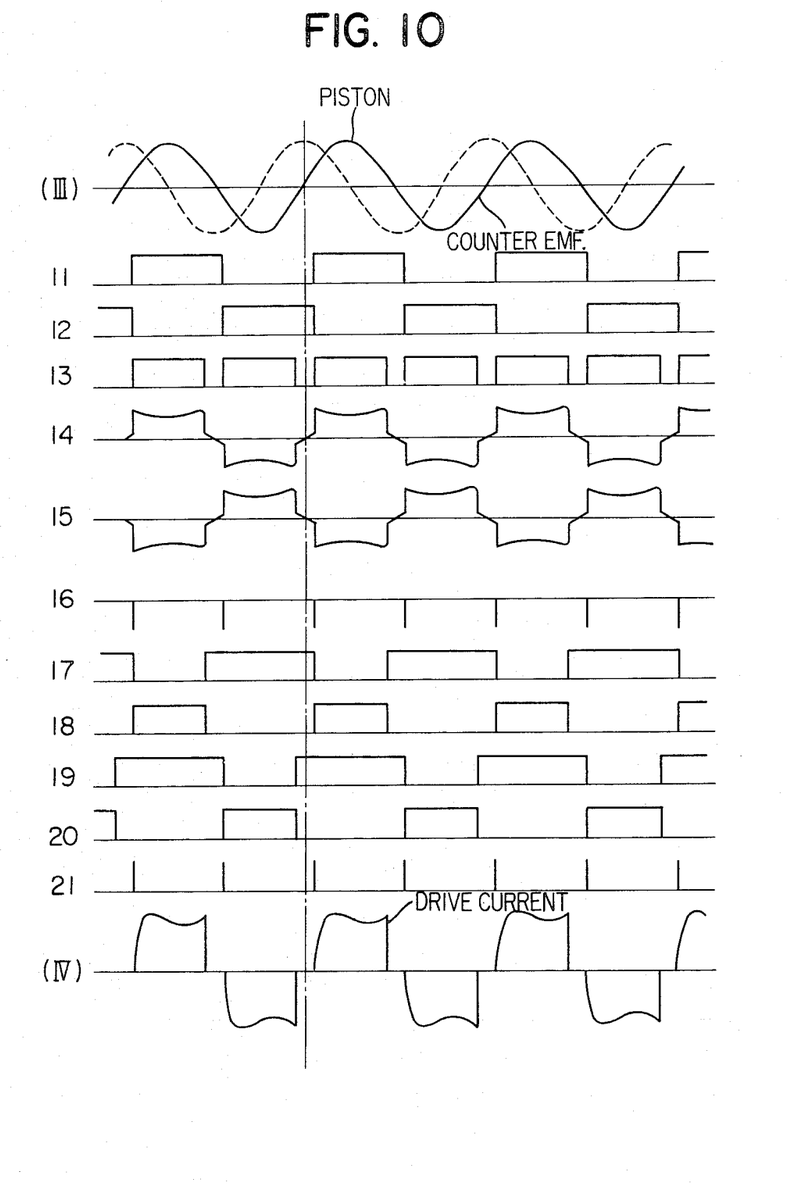
FIG. 10 is a time chart illustrating the operation thereof.

FIG. 10 is a time chart of assistance in illustrating the operation of the circuit diagram of FIG. 9. ⑪, ⑫, ... ㉑ in the figure represent the potentials at the corresponding points ⑪', ⑫', ... ㉑' in FIG. 9. (III) and (IV) in the figure represent the wave form of the counter electromotive force corresponding to FIG. 1 and the wave form of the drive current fed to the drive coil 1, respectively.

In FIGS. 6 or 9, the zero-cross shift circuit 8 or 8A and 8B are shown as comprised of a series circuit of a diode and a Zener diode. With this circuit configuration, a voltage can be generated at the point Y, for example, in FIG. 6 to feed base current to the transistor $TR_5$ when the value obtained by rectifying a vibrating voltage appearing at the point X, for example, in FIG. 6 by means of the diode exceeds a threshold value given by the Zener diode. Needless to say, with the assumption that the vibrating voltage appearing at the point X in the figure has essentially a fixed period, the transistor $TR_5$ shown in FIG. 6 may be turned on with a predetermined time lag from the timing $t_O$ at which the vibrating voltage intersects with the zero level.

Figure 11:
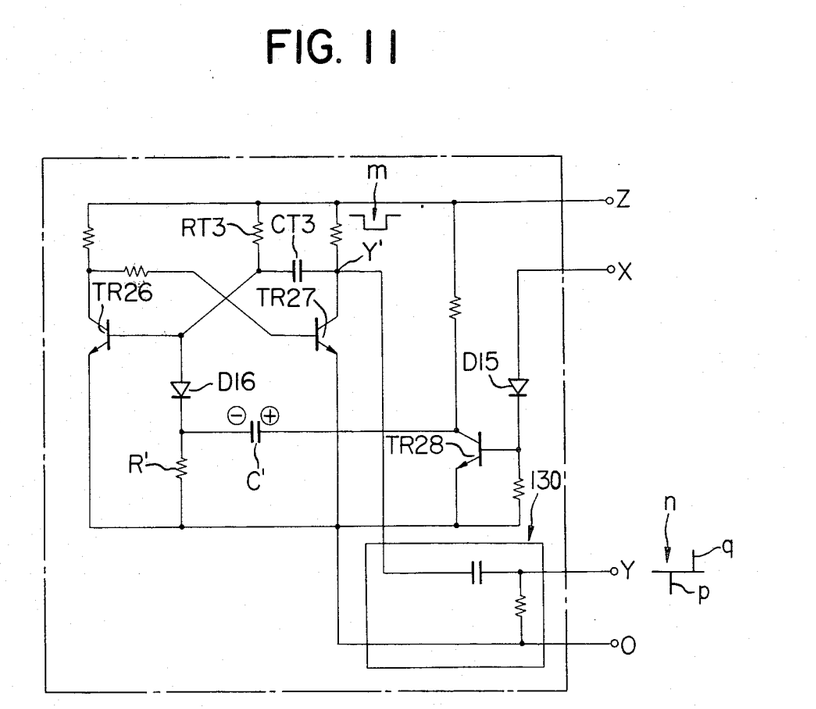
FIG. 11 is a circuit diagram of the zero-cross shift circuit of FIGS. 6 and 9, showing another modification.

FIG. 11 is a circuit diagram of another modification of the zero-cross shift circuit constructed based on this concept.

In the figure, $TR_{26}$ through $TR_{28}$ refer to the transistors; $D_{15}$ and $D_{16}$ to diodes; 130 to a differentiation circuit; $CT_3$ and $C'$ to capacitors; $RT_3$ and $R'$ to resistors, respectively. Terminals X, Y, Z and O in the figure can be considered as connected to the points X, Y, Z and O shown in FIG. 6.

When the value obtained by rectifying a vibrating voltage appearing at the point X in the figure by means of the diode $D_{15}$ takes a positive value with respect to the terminal O in the figure, the transistor $TR_{28}$ is turned on. At this timing, the charge accumulated in the capacitor $C'$ as shown by + and − in the figure is discharged via the transistor $TR_{28}$ and the resistor $R'$. As a result, the base current of the transistor $TR_{26}$ is bypassed via the diode $D_{16}$, causing the transistor $TR_{26}$ to turn off. With this, the transistor $TR_{27}$ is turned on, causing the potential at the point $Y'$ in the figure to decrease to zero. Then, the capacitor $CT_3$ is gradually charged via the resistor $RT_3$, and after the lapse of a predetermined time, the transistor $TR_{26}$ is turned on and the transistor $TR_{27}$ is turned off. Consequently, the potential at the point $Y'$ in the figure is restored to positive as shown by the wave form m in the figure. The potential at the point $Y'$ is differentiated by the differentiation circuit 130, causing a pulse voltage as shown by the wave form n in the figure to generate at the terminal Y. The timing of a pulse p (the wave form n) is said timing $t_O$. After the lapse of a predetermined time after $t_O$, a pulse q (the wave form n) is generated at the same timing above, causing the transistor $TR_5$, for example, in FIG. 6 to turn on. This means that the transistor $TR_5$ is turned on with the time lag $T_D$ shown in FIG. 7.

As described above, this invention makes it possible to detect the counter electromotive force generated in the drive coil by directly monitoring the terminal voltage of the drive coil. In order to make it possible to directly monitor the counter electromotive force with the terminal voltage of the drive coil, an alternating voltage is applied at such timings that the preceding and succeeding period of the timing $t_O$ at which the counter electromotive force intersects with the zero level can be avoided. For this reason, this invention makes it possible to operate a vibrating compressor with high efficiency. Furthermore, this invention makes it possible to operate the vibrating compressor quite stably at all times since a drive current fed to the drive coil is little affected by ripple components which may be contained in the d-c voltage, as described referring to FIGS. 3 and 4.

This invention also makes it possible to provide precise switching timings even when the coefficient $h_{FE}$ of the main switching element changes. In addition, even when there exist inductive components superposed on the power source and output sides of the d-c/a-c converter circuit, the invention makes it possible to ensure the stable operation of the vibrating compressor at all times without being affected by the inductive components.

What is claimed is:

1. A vibrating compressor having a drive coil which is vibrated in a magnetic field by an alternating current supplied from a power source for driving a piston wherein a d-c/a-c converter circuit comprising at least one main switching element for supplying said alternating current to said drive coil; a zero-cross delay circuit for monitoring the level of a voltage generated in said drive coil, detecting a timing at which the voltage level intersects with the zero level, and generating a signal after the lapse of a predetermined time from the time at which the voltage level intersects with the zero level; an on-time cycle setting circuit which is triggered in accordance with the output of the zero-cross delay circuit to set the time cycle of the ON or OFF state of said main switching element; and a starting circuit for supplying starting signals to said on-time cycle setting circuit is provided, and characterized in that said on-time cycle setting circuit is constructed so as to bring said main switching element into the ON state to apply voltage to said drive coil at a timing given by the output of said zero-cross delay circuit after an alternating counter electromotive force generated in said drive coil has intersected with said zero level, and so as to bring said main switching element into the OFF state at a timing before said alternating counter electromotive force subsequently intersects with said zero level.

2. A vibrating compressor as set forth in claim 1 wherein said on-time cycle setting circuit is comprised of a multivibrator the state changes of which are given by signals from said zero-cross delay circuit and sustained for a predetermined time, and said main switching element is controlled by the output of said on-time cycle setting circuit.

3. A vibrating compressor as set forth in claim 2 wherein said on-time cycle setting circuit applies an ON signal to said main switching element upon receiving the ON outputs of said zero-cross delay circuit and a zero-point detect suppression circuit.

4. A vibrating compressor as set forth in claim 1 or 2 wherein said d-c/a-c converter circuit has two main switching elements connected to the primary side of a transformer for supplying said alternating current to said drive coil connected to the secondary side of said transformer; a logical product portion connected to each of said main switching elements; a multivibrator for supplying input to either of the input terminals of each of said logical product portion; and two zero-cross delay circuits provided on the primary side of said transformer, and characterized in that said alternating current is supplied to said drive coil by on-off controlling said main switching elements by means of the logical product of the output of said multivibrator generated by synchronizing signals from each of said zero-cross delay circuits and the ON signals of said on-time cycle setting circuit.

5. A vibrating compressor as set forth in claim 1 wherein said starting circuit is comprised of a unijunction transistor, a capacitor and resistors, and characterized in that said starting circuit gives a signal to said on-time cycle setting circuit by an ON signal of said unijunction transistor which is turned on after a predetermined time after the application of the voltage to make said main switching element turn on.

6. A vibrating compressor as set forth in claim 1 wherein said zero-point detect suppression circuit comprises a multivibrator and a switching transistor, and characterized in that said zero-point detect suppression circuit detects a kick voltage generated in said drive coil to turn on said switching transistor, and thereby locking said on-time cycle setting circuit during the transient period of said kick voltage.

7. A vibrating compressor as set forth in claim 1 wherein said zero-cross delay circuit is connected to said switching transistor via a series circuit consisting of a diode and a Zener diode connected to the terminals of said drive coil.

8. A vibrating compressor as set forth in claim 1 wherein said zero-cross delay circuit having a diode connected to the terminal of said drive coil and a monostable circuit triggered by the output of said diode, and characterized in that the output terminal of said monostable circuit is connected to said switching transistor.

9. A vibrating compressor as set forth in claim 2 wherein the multivibrator of said on-time cycle setting circuit comprises a flip-flop.

10. A vibrating compressor as set forth in claim 9 wherein the multivibrator of said on-time cycle setting circuit has a timing setting portion for determining on-time cycles, the timing setting portion having a temperature compensating means.

* * * * *